(12) United States Patent
Tesson et al.

(10) Patent No.: US 11,997,079 B2
(45) Date of Patent: May 28, 2024

(54) METHOD TO MONITOR SENSITIVE WEB EMBEDDED CODE AUTHENTICITY

(71) Applicant: THALES DIS FRANCE SAS, Meudon (FR)

(72) Inventors: Olivier Tesson, Meudon (FR); Patrick George, Meudon (FR); Sridhar Bhupathiraju, Meudon (FR); Anthony Ferrari, Meudon (FR)

(73) Assignee: THALES DIS FRANCE SAS, Meudon (FR)

( * ) Notice: Subject to any disclaimer, the term of this patent is extended or adjusted under 35 U.S.C. 154(b) by 327 days.

(21) Appl. No.: 17/413,568

(22) PCT Filed: Dec. 3, 2019

(86) PCT No.: PCT/EP2019/083431
§ 371 (c)(1),
(2) Date: Jun. 13, 2021

(87) PCT Pub. No.: WO2020/126462
PCT Pub. Date: Jun. 25, 2020

(65) Prior Publication Data
US 2022/0086132 A1    Mar. 17, 2022

(30) Foreign Application Priority Data
Dec. 18, 2018   (EP) .................................... 18306723

(51) Int. Cl.
*H04L 9/40* (2022.01)
*H04L 67/02* (2022.01)

(52) U.S. Cl.
CPC .............. *H04L 63/08* (2013.01); *H04L 67/02* (2013.01)

(58) Field of Classification Search
None
See application file for complete search history.

(56) References Cited

U.S. PATENT DOCUMENTS

| | | | |
|---|---|---|---|
| 2014/0108263 A1* | 4/2014 | Ortiz ...................... | G06Q 20/36 705/44 |
| 2015/0326562 A1* | 11/2015 | Belote ................. | H04L 63/0815 726/4 |
| 2016/0019536 A1* | 1/2016 | Ortiz ...................... | G06Q 20/36 705/67 |
| 2017/0180351 A1 | 6/2017 | Lu et al. | |
| 2018/0083835 A1 | 3/2018 | Cole et al. | |

FOREIGN PATENT DOCUMENTS

| | | | | |
|---|---|---|---|---|
| CA | 2920661 C | * | 5/2019 | ........... G06Q 20/322 |
| GB | 2549786 A | * | 11/2017 | ......... G06F 21/6254 |
| JP | 2014063069 A | | 4/2014 | |

OTHER PUBLICATIONS

PCT/EP2019/083431, International Search Report, dated Jan. 23, 2020, European Patent Office, P.B. 5818 Patentlaan 2 NL—2280 HV Rijswijk.

(Continued)

*Primary Examiner* — Kaveh Abrishamkar

(57) ABSTRACT

Mechanism to enable an Identity Provider having an authorization gateway and an authentication interface to control the download and the execution of an authentication script component managed by a broker or by a service provider.

11 Claims, 1 Drawing Sheet

(56) References Cited

OTHER PUBLICATIONS

PCT/EP2019/083431, Written Opinion of the International Searching Authority, dated Jan. 23, 2020, European Patent Office, D-80298 Munich.
Mobile Device Identification via Sensor Fingerprinting, Hristo Bojinov, et al., Stanford University and National Research & Simulation Center, Rafael Ltd., Aug. 6, 2014, Cite as: arXiv:1408.1416v1 [cs.CR].

* cited by examiner

METHOD TO MONITOR SENSITIVE WEB EMBEDDED CODE AUTHENTICITY

FIELD OF THE INVENTION

The present invention relates to a method to control the download and the execution of an authentication script component managed by a broker or a service provider.

BACKGROUND OF THE INVENTION

In known infrastructures where authentication is required, identity providers distribute pre-defined web authentication methods to third parties, named brokers in the following. Such web authentication methods are implemented as scripts, typically ECMAScript such as JavaScript that are embedded in the broker login web page. The identity provider requires an authenticity check of these scripts since they implement the user authentication logic.

Known infrastructures implements more and more brokers. As defined in CIO essential guide "The history of cloud computing and what's coming next", a broker is a software application that facilitates the distribution of work between different service providers. They are particularly used in the context of cloud infrastructure where they can be qualified as cloud broker or cloud agents.

Such brokers have various functions and evolve regularly in function of the needs of service providers and end-users.

For example, a broker is responsible for performing a search on behalf of end-users. Once such a research has been completed, the broker presents the customer with a short list of recommended cloud providers and the customer contacts the vendor(s) of choice to arrange service.

A cloud broker may also be granted the rights to negotiate contracts with cloud providers on behalf of the customer. In such a scenario, the broker is given the power to distribute services across multiple vendors in an effort to be as cost-effective as possible, in spite of any complexity that negotiations with multiple vendors might involve. The broker may provide the customer with an application program interface API and user interface UI that hides any complexity and allows the customer to work with their cloud services as if they were being purchased from a single vendor. This type of broker is sometimes referred to as a cloud aggregator.

In addition to acting as an intermediary for contract negotiations, a cloud broker might also provide the customer with additional services, facilitating the deduplication, encryption and transfer of the customer's data to the cloud and assisting with data lifecycle management DLM. This type of broker is sometimes referred to as a cloud enabler. Another type of broker, sometimes referred to as a cloud customizer or white label cloud service, selects cloud services on behalf of a customer, integrates the services to work together and sells the new offering under their own brand.

The business model for cloud brokerage is still evolving. At its simplest, the customer may hire a broker at the beginning of a project and pay the broker an hourly fee for their time. A broker providing more robust services, however, may charge the customer on a sliding scale, depending on what services the customer contracts for. A broker may also partner with one or more cloud service providers and take a small percentage of the cloud provider's profit as remuneration once the customer has arranged service.

In the application of such functions as defined in the CIO guide, the brokers may need the end-user to be authenticated at an identity provider.

For example the broker deals with several service providers or resource or data owners and must then manage the authentication at an identity provider which can be a governmental authority or a more commercial entity.

Among known solution to partially secure the genuineness, the use of API keys enables to provide a first level of trust. It is however not possible to provide a full trust chain as the end-user user-agent, typically the web browser cannot be trusted.

Other methods based on the OAuth protocol like Open ID Connect 1.0 allows clients of all types, including Web-based, mobile, and JavaScript clients, to request and receive information about authenticated sessions and end-users.

This protocol is a simple identity layer on top of the OAuth 2.0 protocol. It allows clients, like service provider to verify the identity of the End-User based on the authentication performed by an Authorization Server, as well as to obtain basic profile information about the end-user in an interoperable and REST-like manner.

The specification suite is extensible, allowing participants to use optional features such as encryption of identity data, discovery of OpenID Providers, and session management, when it makes sense for them. It is however a 3-leg protocol: end-user, identity provider and resource owner. It does not enable to trust the download and execution of a script when a broker is present in affiliation with a resource owner. The presence of a broker is not compulsory but when present, there is no possibility to easily check the genuineness of the script.

There is currently no simple and efficient method to make the identity provider sure that the authentication API calls are actually performed by authentication script components as genuinely distributed by said identity provider when a broker is present or if the service provider itself plays the role of the broker. Indeed there is still an issue in easily checking the script if the service provider plays a broker's equivalent role.

Further alternative and advantageous solutions would, accordingly, be desirable in the art.

SUMMARY OF THE INVENTION

The present invention proposes a solution to enable an identity provider to control the download and the execution of an authentication script in any infrastructure as known, including the ones implementing a broker.

The present invention is defined, in its broadest sense, as a method to enable an Identity Provider having an authorization gateway and an authentication interface to control the download and the execution of an authentication script component managed by a broker or by a service provider, said method comprising the step of:

for the broker, after reception of a request to get a web application login page from an user agent, requesting a pre-authorization at the Authorization Gateway with a broker identifier and contextual information relative to at least an end-user connection, receiving a random token in answer, requesting the creation of an authentication script component with its URL as an Authentication Front End on the basis of the random token at a front-end delivery, said authentication front-end being able to retrieve currently observed contextual information at the user agent, embedding the random token and the URL for the authentication front-end in the web application login page and sending the web application login page to the user agent, for the front-end delivery, while receiving an authentication request to get the URL of the authentication front end with a token, provisioning the authentication front-end to the user-agent;

for the authentication interface, while receiving, from the user-agent, calls for authentication including at least the broker identifier, the token and the currently observed contextual information, checking the currently observed contextual information, the broker identifier and the token, the authentication being positive if the currently observed contextual information and the broker identifier corresponds to the contextual information and broker identifier received in the pre-authorization request and if the token in the API call corresponds to the random token sent in answer to the pre-authorization request (PA) and processing the request in case of positive authentication.

The invention proposes a 4-legs protocol implicating the end-user, the identity provider, the resource owner or service provider and the broker. This method improves the authenticity and the consistency of the execution of sensitive mobile code fragments executed in a browser. With the invention, web embedded code authenticity can be controlled by the identity provider as it allows the validation of the authenticity of a mobile code fragment executing calls to an API and a strict control of the execution context and of the workflow.

The pre-defined sequence of the protocol of the invention enables to control the download and the execution of the authentication front-end javascript component, also named script, as well as the execution of the embedded API calls.

In the invention, brokers embed in their web applications the relevant script to authenticate end-users according to a method pre-defined between the identity provider and the broker. These scripts are named authentication front-ends AFE or AFE.js.

Advantageously, the method comprises the additional step of, for the front-end delivery of the web application, once the authentication front-end is downloaded to the publication URL in answer to the request to get the URL from the user agent, confirming to the Authorization Gateway that the AFE has been downloaded.

This confirmation reinforces the control by the identity provider that receives a confirmation that the script has well been downloaded at the user-agent. Such a flag delivery step informs the identity provider that the script downloading has been correctly performed.

According to an additional feature, the method further comprises the step of, for the Authorization Gateway, updating a status flag for the authentication front-end to a delivered status.

The monitoring of the authentication front-end by the authorization gateway using a simple status flag is an economical and efficient implementation.

According to a first implementation, the front-end delivery is in the broker trust boundaries.

This implementation corresponds to the situation where the broker is allowed to create the authentication front-end by the identity provider. However the identity provider has the possibility to check the allocated random token, the contextual information and the broker identifier.

According to a second implementation, the front-end delivery is on the identity provider's core service back-end which is the back-end for the services as proposed by the identity provider.

In such an implementation, the identity provider generates itself the authentication front-end script and thus has further the control of the creation of the script.

According to an advantageous feature, the broker, when embedding the URL of the authentication front-end, also embeds integrity data in the web application login page to enable a sub resource integrity check.

The presence of integrity data enables to check, when needed, the integrity of the authentication front-end as created at the front end delivery.

Advantageously, the method comprises an additional step of, for the user agent, validating the authentication front-end integrity using a sub resource integrity check after reception of the authentication front-end.

Such a check of the integrity enables the user agent to be sure that the right authentication front end as previously created by the front-end delivery is well the one that it has received.

The invention proposes an original combination of web mechanisms including session-bound tokens, exploitation of context information, including user-agent IP address, broker identification, browser fingerprinting, integrity method like SRI, to solve the problem solved by the invention.

To the accomplishment of the foregoing and related ends, one or more embodiments comprise the features hereinafter fully described and particularly pointed out in the claims.

BRIEF DESCRIPTION OF THE DRAWINGS

The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION OF EMBODIMENTS OF THE INVENTION

Figure 1:
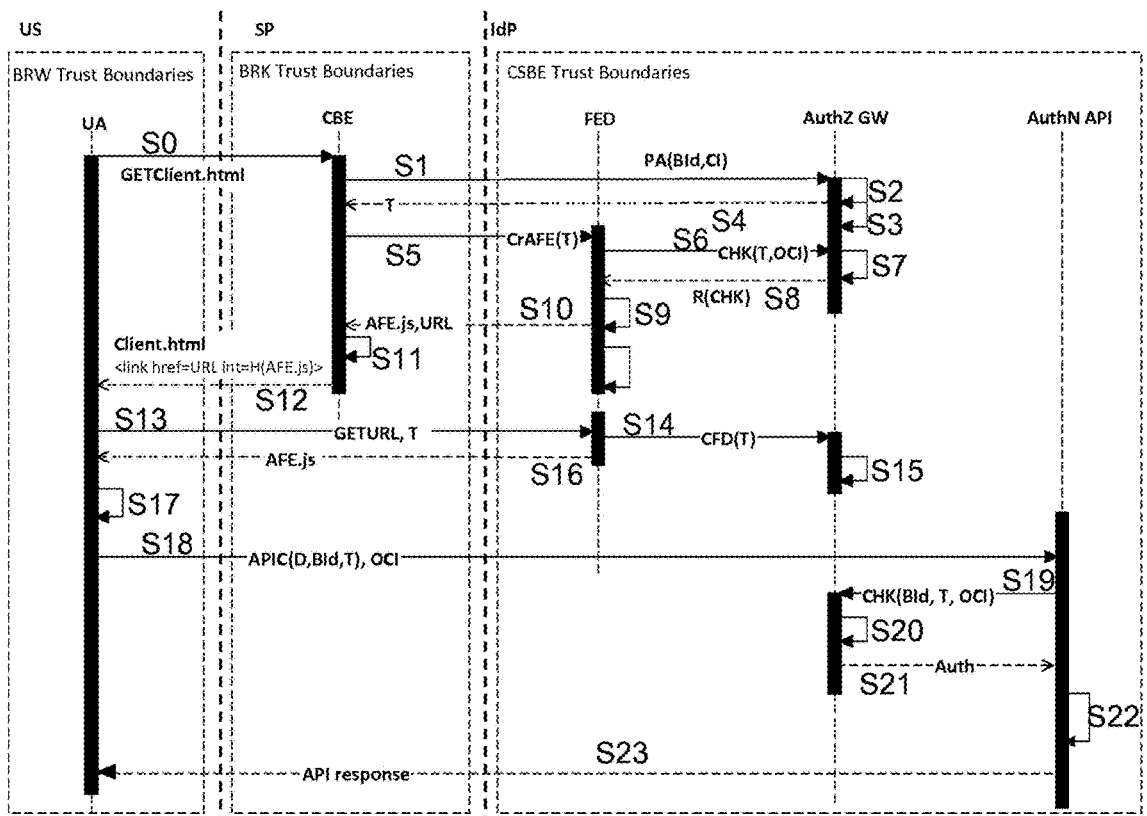
FIG. 1 schematically represents the workflow of the method of the invention.

For a more complete understanding of the invention, the invention will now be described in detail with reference to the accompanying drawing. The detailed description will illustrate and describe what is considered as a preferred embodiment of the invention. It should of course be understood that various modifications and changes in form or detail could readily be made without departing from the spirit of the invention. It is therefore intended that the invention may not be limited to the exact form and detail shown and described herein, nor to anything less than the whole of the invention disclosed herein and as claimed hereinafter. The same elements have been designated with the same references in the different drawings. For clarity, only those elements and steps which are useful to the understanding of the present invention have been shown in the drawings and will be described.

FIG. 1 schematically shows a workflow of a preferred embodiment of the method of the invention. The method is implemented in an environment where a user US can request, using a user agent UA active in a browser BRW, the access to a service managed by a broker BRK or by a service provider affiliated to the broker BRK. The end-user US thus connects to the broker BRK web site to get a login page. A command GETClient.html is thus classically sent to a client back-end CBE owned by the broker BRK in a step S0.

This command triggers a pre-authorization process at a core services back-end CSBE SP of an identity provider IdP having core services. The core services back-end CSBE comprises an Authorization Gateway AuthZ GW to which a pre-authorization message is sent in a step S1 by the client back-end CBE.

Such a pre-authorization message PA comprises an identifier BId of the broker BRK and contextual information CI. Thus when an access to a web application is required by an end user after his/her connection, in the invention, the broker requests a pre-authorization to the Authorization Gateway of the Identity Provider by sending contextual information relative to the end user connection with a broker identifier.

Such contextual information comprises end-user data such as User-Agent, IP, geolocation information, browser fingerprint, etc.

The Authorization Gateway AuthZ GW creates an entry with the received contextual information and the received broker identifier and also generates a timestamp TS and a random token T in a step S2. It then stores the token T and session data in a step S3 and sends the token T to the client back-end CBE in a step S4.

The client back-end CBE then requests the creation of an authentication front-end AFE of the concerned web application by sending a creation request CrAFE(T) including the token T at a front-end delivery FED in a step S5.

Before creating the AFE, the front-end delivery FED sends for verification CHK, in a step S6, the token T with observed connection contextual information OCI to the Authorization Gateway AuthZ GW.

In a step S7, the token and contextual information are verified and the result of the verification R(CHK) is returned to the front-end delivery FED in a step S8. In the case the answer is positive, the front-end delivery FED generates a script for an authentication front-end file that embeds the token T and an identifier BId of the Broker BRK in a step S9. In a step S10, the front-end delivery FED returns a delivery URL and publish the AFE, typically a javascript AFE.js, to the URL.

Advantageously, the front-end delivery FED also returns a hash of the authentication front-end with the delivery URL.

In a step S11, while receiving the script AFE, the client back-end CBE at the broker BRK creates a web page client.html which is sent in a step S12 to the user-agent. At this step, the broker BRK embeds the link to the authentication front-end AFE using Subresource Integrity (SRI) method into the login page. This integrity data int and http data link href are part of the message.

The reception of the client.html enables the user agent UA to connect to the front end delivery FED to request the URL of a web page of a web service displayed to the user in a step S13. While sending the request GETURL, the user agent UA sends the received and stored token T.

The user agent UA thus downloads the authentication front-end AFE to the publication URL.

It enables the front-end delivery FED to forward the token T to the Authorization Gateway AuthZ GW in a step S14 to confirm the delivery CFD(T) of the token to the user agent UA. It enables the front-end delivery services FED to confirm to the Authorization Gateway Authz GW that the authentication front-end AFE has been downloaded.

The Authorization Gateway AuthZ GW, while receiving the token T, flags the user agent UA as having a delivered authentication front end AFE in a step S15. Advantageously the Authorization Gateway updates set a status flag to "delivered".

The reception of the token T at the front end delivery FED triggers the sending of an authentication front end AFE script to the user agent UA in a step S16. The integrity is then advantageously checked in a step S17. The SRI method is advantageously used the end-user user-agent UA validates the authentication front end integrity using SRI.

Then API calls APIC of the user agent UA are sent in a step S18 to an authentication service interface AuthN API. It is here noted that it can be useful to encrypt the API calls for security reason. According to the invention, the end-user user-agent UA executes the authentication front-end API calls. These calls APIC embeds at least the token T as stored at the user agent, the broker identifier BId and additional data D relative to the request of the user US. Observed contextual information OCI are also attached to the API call.

In step S19, when the identity provider IdP receives the first API call, the AuthN API then requests the gateway AuthZ GW to check the consistency of the data including the token T, the broker BRK identifier BId and the content of the contextual information OCI. Once this verification is done in a step S20 an authorization Auth for the API call is sent back to the API in a step S21.

While receiving the authorization Auth, the AuthN API processes the request of the call in a step S22 and a response to the API call is sent to the user agent UA in a step S23.

At each API call, the identity provider IdP can check that the pre-defined workflow is respected and can block out of sequence calls. The token T, broker identifier BId and contextual information are indeed provided at each API calls according to the invention.

Figure 2:
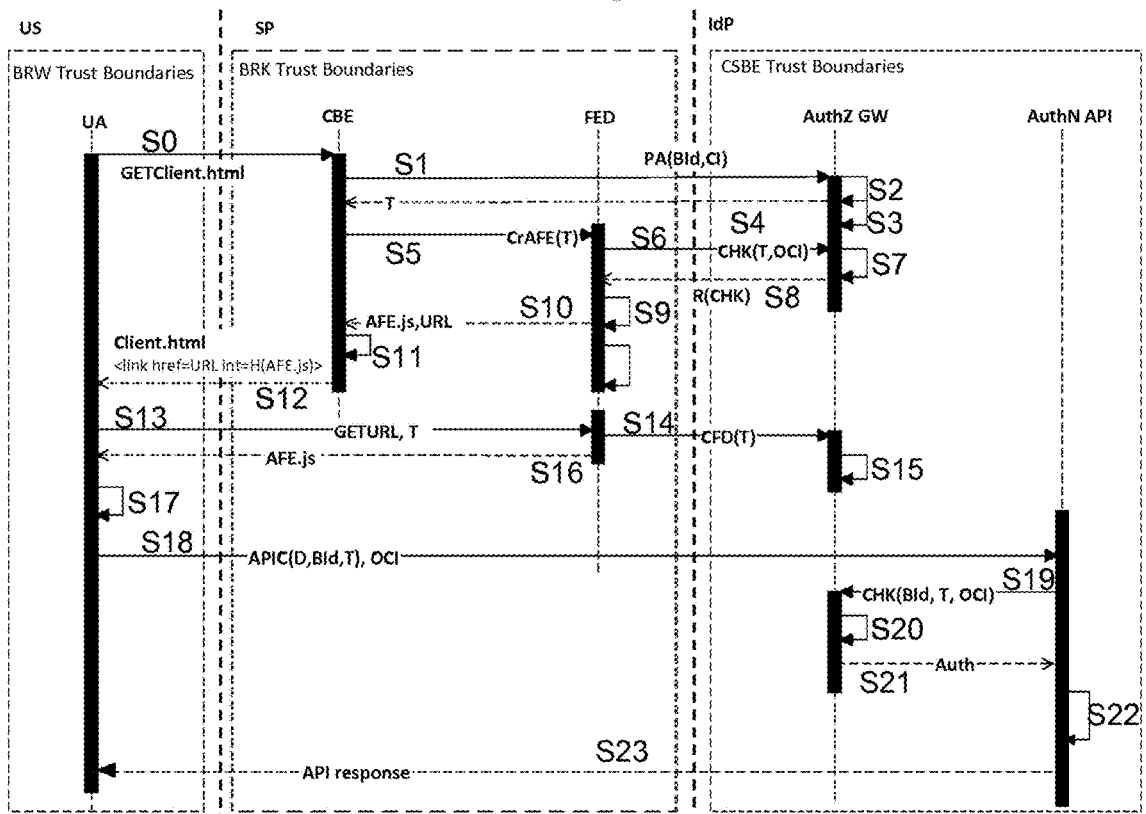
FIG. 2 schematically represents an alternative workflow of the method of the invention.

FIG. 2 shows an alternative workflow where the front end delivery FED is implemented at the broker BRK side. In both cases end-users are needed to be authenticated by service providers SP affiliated to the broker BRK. The core service back-end CSBE is belonging to an authentication entity which is typically an identity provider IdP, typically a governmental entity or any other official identity provider, while the service provider SP is a bank or a governmental authority or any private or public entities. For example it can be a public, private or semi-private health authority.

In the above detailed description, reference is made to the accompanying drawings that show, by way of illustration, specific embodiments in which the invention may be practiced. These embodiments are described in sufficient detail to enable those skilled in the art to practice the invention. The above detailed description is, therefore, not to be taken in a limiting sense, and the scope of the present invention is defined only by the appended claims, appropriately interpreted, along with the full range of equivalents to which the claims are entitled.

The invention claimed is:

1. A method to enable an Identity Provider having an authorization gateway and an authentication interface to verify authenticity of an authentication script component that is used by a user agent active in a web browser to issue authentication API calls and that is managed by a broker or by a service provider, said method comprising:

for the broker, after reception of a request to get a web application login page from a user agent, requesting a pre-authorization at the Authorization Gateway with a broker identifier and contextual information relative to at least an end-user connection, receiving a random token in answer, requesting the creation of an authentication front end script on the basis of the random token at a front-end delivery, said front-end delivery being able to retrieve currently observed contextual information at the user agent, embedding the random token and the URL for the authentication front-end in the web application login page and sending the web application login page to the user agent, for the front-end delivery, while receiving a request for an authentication front end including the token from the broker, sending the token and the contextual information to the authorization gateway, and generating the authentication front end script embedding the token and the broker identifier, and providing the authentication front end script and the URL for the login page to the broker, and while receiving an authentication request to get the URL of the authentication front end with a token, provisioning the authentication front end to the user agent, for the authentication interface, while receiving, from the user-agent, calls for authentication including at least the broker identifier, the token and the currently observed contextual information, checking the currently observed contextual information, the broker identifier and the token, the authentication being positive if the currently observed contextual information and the broker identifier corresponds to the contextual information and broker identifier received in the pre-authorization request and if the token in the API call corresponds to the random token sent in answer to the pre-authorization request (PA), and processing the request in case of positive authentication.

2. The method according to claim 1, comprising the additional step of, for the front-end delivery of the web application, once the Authentication front-end is downloaded to the publication URL in answer to the request to get the URL from the user agent, confirming to the Authorization Gateway that the AFE has been downloaded.

3. The method according to claim 2, comprising the further step of, for the Authorization Gateway, updating a status flag for the authentication front-end a delivered status.

4. The method according to claim 1, wherein the front-end delivery is in the broker trust boundaries.

5. The method according to claim 1, wherein the front-end delivery is on the identity provider's core service back-end.

6. The method according to claim 1, wherein the broker, when embedding the URL of the authentication front-end, also embeds integrity data in the web application login page to enable a sub resource integrity check.

7. The method according to claim 6, comprising an additional step of, for the user agent, validating the authentication front-end integrity using a sub resource integrity check after reception of the authentication front-end.

8. The method according to claim 2, wherein the front-end delivery is in the broker trust boundaries.

9. The method according to claim 3, wherein the front-end delivery is in the broker trust boundaries.

10. The method according to claim 2, wherein the front-end delivery is on the identity provider's core service back-end.

11. The method according to claim 3, wherein the front-end delivery is on the identity provider's core service back-end.

* * * * *